US009124516B2

(12) United States Patent
Assarpour

(10) Patent No.: US 9,124,516 B2
(45) Date of Patent: Sep. 1, 2015

(54) METHOD AND APPARATUS PROVIDING SPLIT MULTI LINK TRUNK (SMLT) FOR ADVANCED TECHNOLOGY ATTACHMENT (ATA) OVER ETHERNET

(75) Inventor: Hamid Assarpour, Arlington, MA (US)

(73) Assignee: AVAYA INC., Basking Ridge, NJ (US)

( * ) Notice: Subject to any disclaimer, the term of this patent is extended or adjusted under 35 U.S.C. 154(b) by 159 days.

(21) Appl. No.: 13/242,642

(22) Filed: Sep. 23, 2011

(65) Prior Publication Data
US 2013/0077471 A1 Mar. 28, 2013

(51) Int. Cl.
*H04J 1/16* (2006.01)
*H04L 12/709* (2013.01)
*H04L 12/24* (2006.01)
*H04L 12/933* (2013.01)
*H04L 12/713* (2013.01)
*H04L 29/08* (2006.01)
*G06F 3/06* (2006.01)

(52) U.S. Cl.
CPC .......... *H04L 45/245* (2013.01); *H04L 41/0663* (2013.01); *H04L 41/0668* (2013.01); *H04L 45/586* (2013.01); *H04L 49/10* (2013.01); *G06F 3/067* (2013.01); *G06F 3/0614* (2013.01); *G06F 3/0635* (2013.01); *G06F 3/0661* (2013.01); *H04L 67/1097* (2013.01); *Y02B 60/33* (2013.01)

(58) Field of Classification Search
None
See application file for complete search history.

(56) References Cited

U.S. PATENT DOCUMENTS

| 2005/0080923 A1* | 4/2005 | Elzur ........................... 709/238 |
| 2008/0056123 A1* | 3/2008 | Howard et al. ................ 370/225 |
| 2008/0189700 A1* | 8/2008 | Schmidt et al. ................. 718/1 |
| 2009/0240783 A1* | 9/2009 | Susairaj et al. ............... 709/217 |
| 2012/0230325 A1* | 9/2012 | Haddock ....................... 370/357 |

OTHER PUBLICATIONS

S. Hopkins, B. Coile, "AoE (ATA over Ethernet)", The Brantley Coile Company, Inc., Feb. 2009.*

* cited by examiner

*Primary Examiner* — Chi H Pham
*Assistant Examiner* — Raul Rivas
(74) *Attorney, Agent, or Firm* — Anderson Gorecki & Rouille LLP

(57) ABSTRACT

A method, apparatus and computer program product for providing Split Multi Link Trunk (SMLT) for Advanced Technology Attachment (ATA) Over Ethernet is presented. All ports on an ATA server are assigned a same Media Access Control (MAC) address. When the first switch receives a packet destined to the second switch the first switch performs a route lookup on a destination address of the packet and forwards the packet to the target over one of the second plurality of links, and when the second switch receives a packet destined to the first switch the second switch performs a route lookup on a destination address of the packet and forwards the packet to the target over one of the second plurality of links.

17 Claims, 4 Drawing Sheets

METHOD AND APPARATUS PROVIDING SPLIT MULTI LINK TRUNK (SMLT) FOR ADVANCED TECHNOLOGY ATTACHMENT (ATA) OVER ETHERNET

BACKGROUND

Advanced Technology Attachment (ATA) over Ethernet (AoE) network protocol provides simple, high-performance access of SATA (serial ATA) storage devices over Ethernet networks. AoE is used to build storage area networks (SANs) with low-cost, standard technologies. AoE runs on layer 2 Ethernet. AoE does not use Internet Protocol (IP) and it cannot be accessed over the Internet or other IP networks. In this regard it is more comparable to Fibre Channel over Ethernet than iSCSI. ATA encapsulation SATA (and older Parallel ATA) hard drives use the ATA protocol to issue commands, such as read, write, and status. AoE encapsulates those commands inside Ethernet frames and lets them travel over an Ethernet network instead of a SATA or 40-pin ribbon cable. By using an AoE driver, the host operating system is able to access a remote disk as if it were directly attached. The encapsulation of ATA provided by AoE is simple and low-level, allowing the translation to happen either at high performance or inside a small, embedded device, or both.

SUMMARY

Conventional mechanisms such as those explained above suffer from a variety of deficiencies. One such deficiency is that for ATA over Ethernet, there is currently no simple solution for providing redundancy and fast failover. If a link or a port fails, then a certain number of packets will be lost until failure recovery can take effect.

Embodiments of the invention significantly overcome such deficiencies and provide mechanisms and techniques that provide redundancy and fast failover for ATA over Ethernet. A failure of one of the network switches is immediately detected by its peer. When a failure is detected, the peer of the failing device takes over the packet processing for the failed device such that packet loss or delay is minimized.

In a particular embodiment of a method for providing SMLT for ATA over Ethernet the method begins with assigning all ports on an ATA server a same Media Access Control (MAC) address. The method also includes providing a first plurality of links from the ports of the ATA server to a first switch and also to a second switch, wherein the first switch is a peer to the second switch, and wherein the first switch and the second switch communicate with each other via an Inter Switch Trunk (IST). The method further includes providing a second plurality of links from the first switch and the second switch to a target, wherein when the first switch receives a packet destined to the second switch the first switch performs a route lookup on a destination address of the packet and forwards the packet to the target over one of the second plurality of links, and when the second switch receives a packet destined to the first switch the second switch performs a route lookup on a destination address of the packet and forwards the packet to the target over one of the second plurality of links.

Other embodiments include a computer readable medium having computer readable code thereon for providing SMLT for ATA over Ethernet. The computer readable medium includes instructions for providing a first plurality of links from the ports of the ATA server to a first switch and to a second switch, wherein the first switch is a peer to the second switch, and wherein the first switch and the second switch communicate with each other via an Inter Switch Trunk (IST). The computer readable medium further includes instructions for providing a second plurality of links from the first switch and the second switch to a target, wherein when the first switch receives a packet destined to the second switch the first switch performs a route lookup on a destination address of the packet and forwards the packet to the target over one of the second plurality of links, and when the second switch receives a packet destined to the first switch the second switch performs a route lookup on a destination address of the packet and forwards the packet to the target over one of the second plurality of links.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides provide redundancy and fast failover for ATA over Ethernet as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing redundancy and fast failover for ATA over Ethernet as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, New Jersey Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

Logical connections between certain devices are referred to herein as Inter-Switch Trunks (ISTs). ISTs may be physical links that extend from one network element to a neighboring network element in the cluster, or may be logical links that tunnel through one or more intermediate network elements within the cluster.

Two or more links may be grouped to form a Multi-Link Trunk (MLT). Each MLT is assigned a MLT group ID (MLT-ID), which is a global value within the cluster and unique across the cluster nodes. An MLT with all its port members only on one node is referred to as a normal MLT group. An MLT group where its port members are on two or more nodes is referred to as a Split MLT or SMLT group.

Link Aggregation Groups (LAGs), also known as trunks, provide increased bandwidth and high reliability. By combining several interfaces into one logical link, LAGs provide the ability to treat multiple switch ports as one switch port. These portgroups act as a single logical port for high-bandwidth connections between two network devices. A LAG balances the traffic load across the links in the channel. If a physical link within the LAG fails, traffic previously carried over the failed link is moved to the remaining links. LAGs provide increased bandwidth and increased availability. The term SMLT is used herein to refer to MLTs, SMLTs and LAGs.

Figure 1:
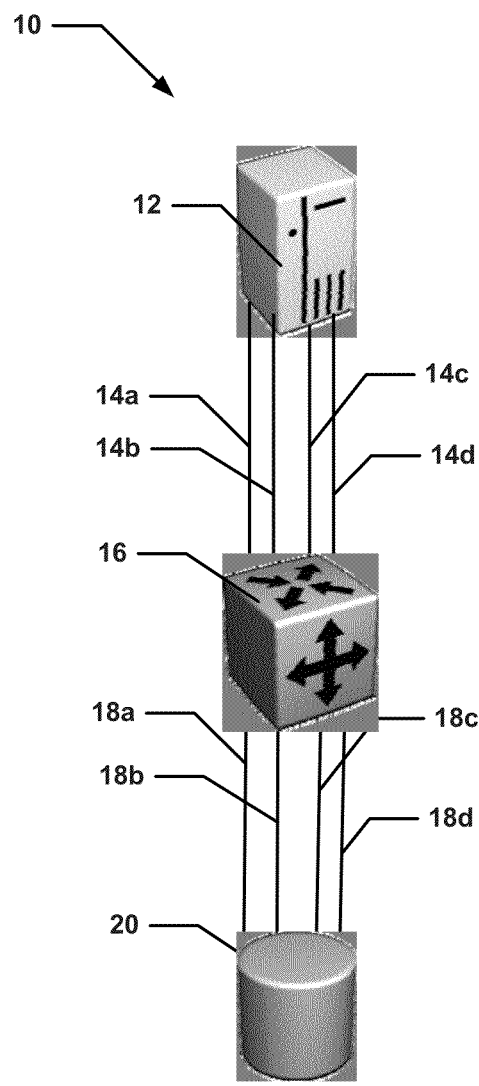
FIG. 1 comprises a block diagram of a prior art ATA over Ethernet environment.

The concept of SMLT is applied to the ATA over Ethernet (AOE) configuration. Referring to FIG. 1, a conventional ATA over Ethernet environment 10 is shown. Environment 10 includes an ATA server 12 in communication with a network switch 16 by way of a plurality of links 14a-14d. Each link is connected to a respective port on ATA server 12 as well as to a respective port on network switch 16. Similarly, a plurality of links 18a-d interconnect respective ports on network switch 16 to storage device 20. Each port on the ATA server has its own unique MAC address.

A potential problem associated with this type of environment occurs in the event of a failure. If a link or a port fails, then a certain number of packets will be lost until failure recovery can take effect. For example, if link 14a, or a port connected to link 14a, fails, the packets destined across link 14a would be lost until such a time that these packets can be retransmitted across an existing link that is operational (e.g. link 14b, 14c or 14d). When link 14a come back online, then that link can be used again.

Figure 2:
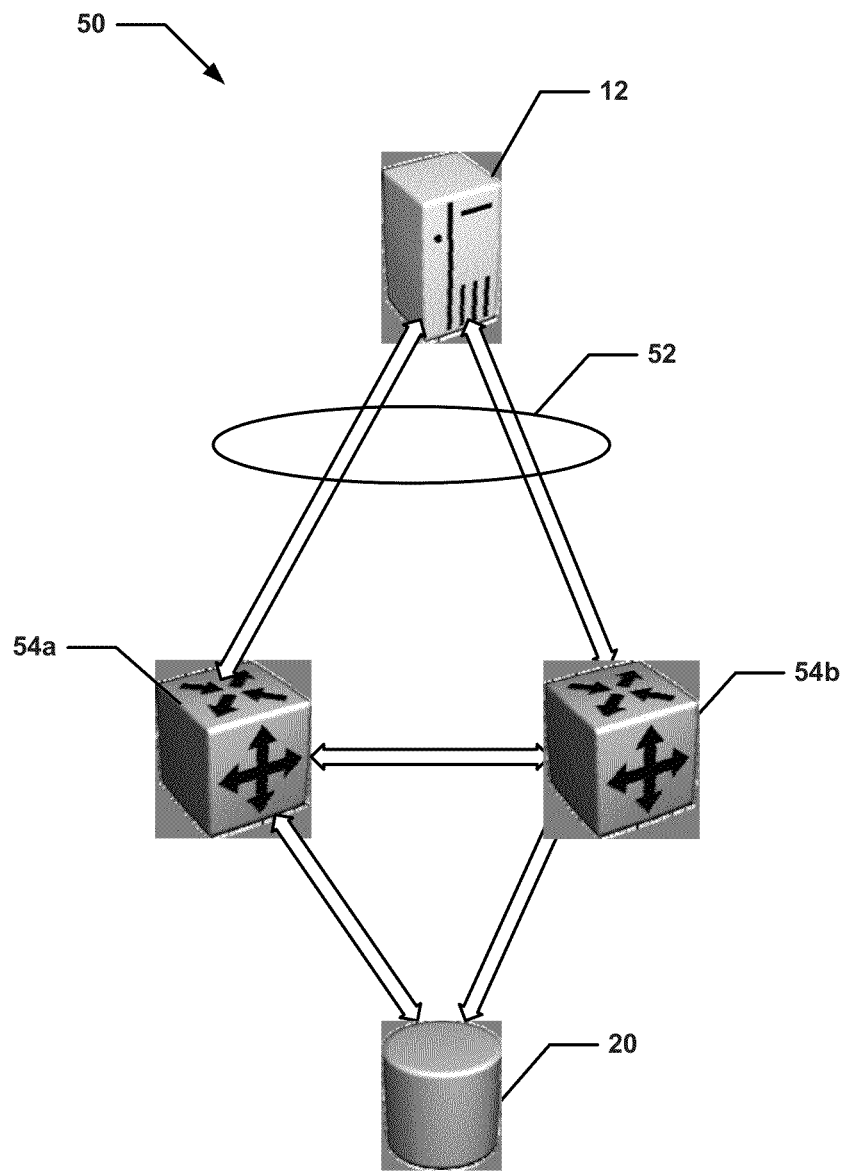
FIG. 2 comprises a block diagram of an SMLT for ATA over Ethernet environment in accordance with embodiments of the present invention.

Referring now to FIG. 2 an environment 50 for providing SMLT over ATA for Ethernet in accordance with the present invention is shown. Environment 50 includes an ATA server 12 in communication with a pair of network switches 54a and 54b by way of a plurality of links 56 and 58. Each link is connected to a respective port on ATA server 12 as well as to a respective port on network switches 54a and 54b. Similarly, a plurality of links 60 and 62 interconnect respective ports on network switches 54a and 54b to storage device 20. In accordance with the present invention, each port of the server is given the same MAC address. This allows the peer switches to handle the traffic between the servers and the targets. In the event of failure of one peer or port, the other peer is able to handle the traffic, thereby providing redundancy and fast failover. Note that in this invention, both the initiator and target do not need to hash flows across the SMLT connection, they use a round-robin across the SMLT port members for traffic distribution.

Specifically, in this example network switch 54a and network switch 54b are interconnected by an inter-switch trunk (IST) 60 which may be a single link or itself may be a multi-link trunk. When the links of a multilink trunk are physically connected to two different network elements, the MLT is called a Split Multi-Link Trunk (SMLT). Network switches 54a and 54b each have one or more links that connects to ATA server 12, which may be grouped together to form a SMLT 52. Thus, if ATA server 12 has data to send to target 20, ATA server 12 will transmit the packet on one of the links associated with the Inter-Switch Trunk 26 to enable one of the network switches 54a or 52b to forward the data on one of its links associated with the SMLT to target 20.

SMLT peers 54a and 54b communicate with each other by means of messages sent over the IST link 56. A failure of the IST link or a total failure of one of the network switches is immediately detected by its peer through monitoring of the IST state. When a failure is detected, the peer of the failing device takes over the packet processing for the failed device such that packet loss or delay is minimized.

Figure 3:
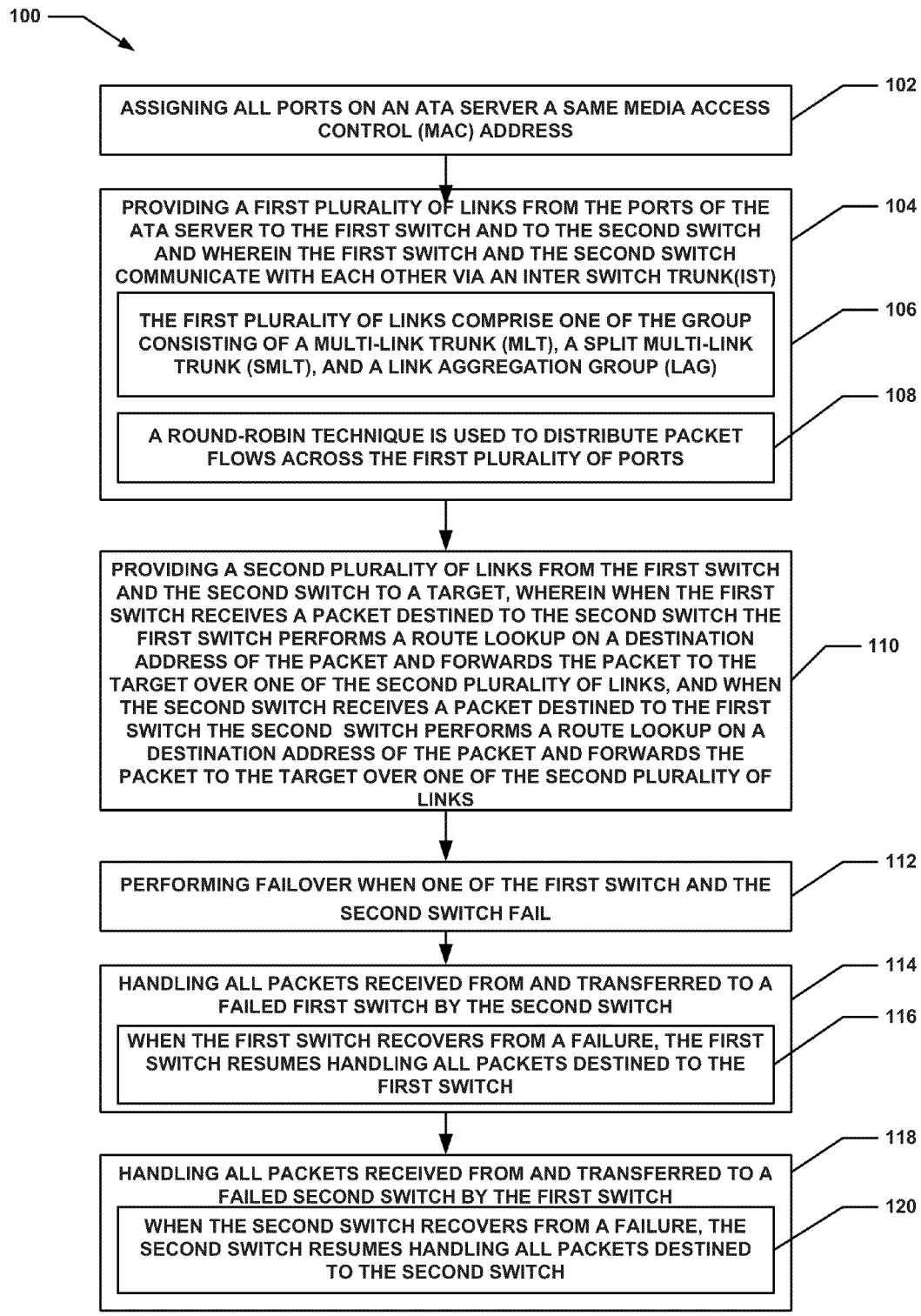
FIG. 3 depicts a flow diagram of a particular embodiment of a method for providing SMLT for ATA over Ethernet in accordance with embodiments of the present invention.

A flow chart of a particular embodiment of the presently disclosed method for providing SMLT for ATA over Ethernet is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, method 100 begins with processing block 102 which discloses assigning all ports on an ATA server a same Media Access Control (MAC) address. This is done so that there is no need to hash flows across the links, and to share traffic across the ports.

Processing block 104 recites providing a first plurality of links from the ports of the ATA server to the first switch and to the second switch and wherein the first switch and the second switch communicate with each other via an Inter Switch trunk (IST). As shown in processing block 106 the first plurality of links comprise one of the group consisting of a multi-link trunk (MLT), a split multi-link trunk (SMLT), and a link aggregation group (LAG). As also shown in processing block 108 a round-robin technique is used to distribute packet flows across the first plurality of ports. This is done to allow for an even distribution of traffic across the ports.

Processing block 110 states providing a second plurality of links from the first switch and the second switch to a target, wherein when the first switch receives a packet destined to the second switch the first switch performs a route lookup on a destination address of the packet and forwards the packet to the target over one of the second plurality of links, and when the second switch receives a packet destined to the first switch the second switch performs a route lookup on a destination address of the packet and forwards the packet to the target over one of the second plurality of links.

Processing block 112 discloses performing failover when one of the first switch and the second switch fail. Processing block 114 states handling all packets received from and transferred to a failed first switch by the second switch. As shown in processing block 116 when the first switch recovers from a failure, the first switch resumes handling all packets destined to the first switch.

Processing block 118 recites handling all packets received from and transferred to a failed second switch by the first switch. As shown in processing block 120 when the second switch recovers from a failure, the second switch resumes handling all packets destined to the second switch.

Figure 4:
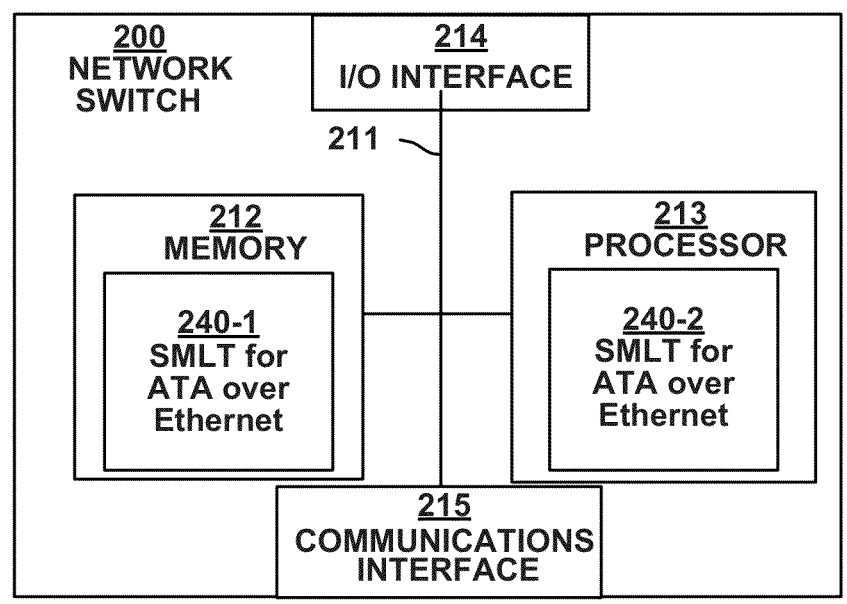
FIG. 4 illustrates an example computer system architecture for a network switch that provides SMLT for ATA over Ethernet in accordance with embodiments of the present invention.

FIG. 4 is a block diagram illustrating example architecture of a computer system (a network switch in a peer arrangement with another network switch) 210 that executes, runs, interprets, operates or otherwise performs a SMLT for ATA over Ethernet operating application 240-1 and SMLT for ATA over Ethernet operating process 240-2 suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a SMLT for ATA over Ethernet operating application 240-1 as explained herein. The SMLT for ATA over Ethernet operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a SMLT for ATA over Ethernet operating application 240-1. Execution of a SMLT for ATA over Ethernet operating application 240-1 in this manner produces processing functionality in the SMLT for ATA over Ethernet operating process 240-2. In other words, the SMLT for ATA over Ethernet operating process 240-2 represents one or more portions or runtime instances of a SMLT for ATA over Ethernet operating application 240-1 (or the entire a SMLT for ATA over Ethernet operating application 240-1) performing or executing within or upon the processor 213 in the computerized device 210 at runtime.

It is noted that example configurations disclosed herein include the SMLT for ATA over Ethernet operating application 240-1 itself (i.e., in the form of un-executed or non-performing logic instructions and/or data). The SMLT for ATA over Ethernet operating application 240-1 may be stored on a computer readable medium (such as a floppy disk), hard disk, electronic, magnetic, optical, or other computer readable medium. A SMLT for ATA over Ethernet operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a SMLT for ATA over Ethernet operating application 240-1 in the processor 213 as the SMLT for ATA over Ethernet operating process 240-2. Those skilled in the art will understand that the computer system 210 may include other processes and/or software and hardware components, such as an operating system not shown in this example.

A display 230 need not be coupled directly to computer system 210. For example, the SMLT for ATA over Ethernet operating application 240-1 can be executed on a remotely accessible computerized device via the network interface 215.

During operation, processor 213 of computer system 200 accesses memory system 212 via the interconnect 211 in order to launch, run, execute, interpret or otherwise perform the logic instructions of the SMLT for ATA over Ethernet application 240-1. Execution of SMLT for ATA over Ethernet application 240-1 produces processing functionality in SMLT for ATA over Ethernet process 240-2. In other words, the SMLT for ATA over Ethernet process 240-2 represents one or more portions of the SMLT for ATA over Ethernet application 240-1 (or the entire application) performing within or upon the processor 213 in the computer system 200.

It should be noted that, in addition to the SMLT for ATA over Ethernet process 240-2, embodiments herein include the SMLT for ATA over Ethernet application 240-1 itself (i.e., the un-executed or non-performing logic instructions and/or data). The SMLT for ATA over Ethernet application 240-1 can be stored on a computer readable medium such as a floppy disk, hard disk, or optical medium. The SMLT for ATA over Ethernet application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of SMLT for ATA over Ethernet application 240-1 in processor 213 as the SMLT for ATA over Ethernet process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method for providing Advanced Technology Attachment (ATA) over Ethernet, the method comprising:
assigning all ports on an ATA server a same Media Access Control (MAC) address, wherein said ATA server encapsulates ATA commands inside Ethernet frames and sends said Ethernet frames over an Ethernet network and wherein said ATA is used to provide high performance access of Serial ATA (SATA) storage devices over said Ethernet network;
providing a first plurality of links from said ports of said ATA server to a first switch and to a second switch, wherein said first switch is a peer to said second switch, and wherein said first switch and said second switch communicate with each other via an Inter Switch Trunk (IST), wherein said assigning all ports on said ATA server a same MAC address allows said first switch and said second switch to handle traffic between said ATA server and said target;
providing a second plurality of links from said first switch and said second switch to a target, wherein when said first switch receives a packet destined to said second switch said first switch performs a route lookup on a destination address of said packet and forwards said packet to said target over one of said second plurality of links, and when said second switch receives a packet destined to said first switch said second switch performs a route lookup on a destination address of said packet and forwards said packet to said target over one of said second plurality of links; and
using a round-robin technique across SMLT port members for traffic distribution.

2. The method of claim 1 wherein said first plurality of links comprise one of the group consisting of a multi-link trunk (MLT), a split multi-link trunk (SMLT), and a link aggregation group (LAG).

3. The method of claim 1 further comprising performing failover when one of said first switch and said second switch fail.

4. The method of claim 3 further comprising handling all packets received from and transferred to a failed first switch by said second switch.

5. The method of claim 3 further comprising handling all packets received from and transferred to a failed second switch by said first switch.

6. The method of claim 4 wherein when said first switch recovers from a failure, said first switch resumes handling all packets destined to said first switch.

7. The method of claim 5 wherein when said second switch recovers from a failure, said second switch resumes handling all packets destined to said second switch.

8. A non-transitory computer readable storage medium having computer readable code thereon for providing Advanced Technology Attachment (ATA) over Ethernet, the medium including instructions in which a computer system including an ATA server, a first switch, a second switch and a target performs operations comprising:

assigning all ports on an ATA server a same Media Access Control (MAC) address, wherein said ATA server encapsulates ATA commands inside Ethernet frames and sends said Ethernet frames over an Ethernet network and wherein said ATA is used to provide high performance access of Serial ATA (SATA) storage devices over said Ethernet network;

providing a first plurality of links from said ports of said ATA server to a first switch and to a second switch, wherein said first switch is a peer to said second switch, and wherein said first switch and said second switch communicate with each other via an Inter Switch Trunk (IST), wherein said assigning all ports on said ATA server a same MAC address allows said first switch and said second switch to handle traffic between said ATA server and said target;

providing a second plurality of links from said first switch and said second switch to a target, wherein when said first switch receives a packet destined to said second switch said first switch performs a route lookup on a destination address of said packet and forwards said packet to said target over one of said second plurality of links, and when said second switch receives a packet destined to said first switch said second switch performs a route lookup on a destination address of said packet and forwards said packet to said target over one of said second plurality of links; and using a round-robin technique across SMLT port members for traffic distribution.

9. The computer readable storage medium of claim 8 further comprising instructions wherein said first plurality of links comprise one of the group consisting of a multi-link trunk (MLT), a split multi-link trunk (SMLT), and a link aggregation group (LAG).

10. The computer readable storage medium of claim 8 further comprising instructions for performing failover when one of said first switch and said second switch fail.

11. The computer readable storage medium of claim 10 further comprising instructions for handling all packets received from and transferred to a failed first switch by said second switch.

12. The computer readable storage medium of claim 10 further comprising instructions for handling all packets received from and transferred to a failed second switch by said first switch.

13. The computer readable storage medium of claim 11 further comprising instructions wherein when said first switch recovers from a failure, said first switch resumes handling all packets destined to said first switch.

14. The computer readable storage medium of claim 12 further comprising instructions wherein when said second switch recovers from a failure, said second switch resumes handling all packets destined to said second switch.

15. A computer system including an Advanced Technology Attachment (ATA) server, a first switch, a second switch and a target, each of said ATA server, said first switch, said second switch and sais target comprising:

a memory;

a processor;

a communications interface;

an interconnection mechanism coupling the memory, the processor and the communications interface; and wherein the memory is encoded with an application providing ATA over Ethernet, that when performed on the processor, provides a process for processing information, the process causing the computer system to perform the operations of:

assigning all ports on an ATA server a same Media Access Control (MAC) address, wherein said ATA server encapsulates ATA commands inside Ethernet frames and sends said Ethernet frames over an Ethernet network and wherein said ATA is used to provide high performance access of Serial ATA (SATA) storage devices over said Ethernet network;

providing a first plurality of links from said ports of said ATA server to a first switch and to a second switch, wherein said first switch is a peer to said second switch, and wherein said first switch and said second switch communicate with each other via an Inter Switch Trunk (IST), wherein said assigning all ports on said ATA server a same MAC address allows said first switch and said second switch to handle traffic between said ATA server and said target;

providing a second plurality of links from said first switch and said second switch to a target, wherein when said first switch receives a packet destined to said second switch said first switch performs a route lookup on a destination address of said packet and forwards said packet to said target over one of said second plurality of links, and when said second switch receives a packet destined to said first switch said second switch performs a route lookup on a destination address of said packet and forwards said packet to said target over one of said second plurality of links; and using a round-robin technique across SMLT port members for traffic distribution.

16. The computer system of claim 15 wherein said first plurality of links comprise one of the group consisting of a multi-link trunk (MLT), a split multi-link trunk (SMLT), and a link aggregation group (LAG).

17. The computer system of claim 15 wherein all packets received from and transferred to a failed first switch are handled by said second switch, and wherein all packets received from and transferred to a failed second switch are handled by said first switch.

* * * * *